United States Patent [19]
Watson et al.

[11] 3,953,286
[45] Apr. 27, 1976

[54] CERAMIC NUCLEAR FUEL PELLETS

[75] Inventors: Ronald Henry Watson; Gregg Glenn Butler, both of Kirkham; Thomas John Heal, Lytham, St. Annes; James Edgar Littlechild, Lytham, all of England

[73] Assignee: British Nuclear Fuels Limited, Warrington, England

[22] Filed: Jan. 11, 1974

[21] Appl. No.: 432,535

[30] Foreign Application Priority Data

Jan. 12, 1973 United Kingdom................. 1665/73
May 18, 1973 United Kingdom............... 23795/73
May 18, 1973 United Kingdom............... 23796/73

[52] U.S. Cl. .............................. 176/66; 176/91 SP; 264/.5
[51] Int. Cl.². ......................................... G21C 3/62
[58] Field of Search............. 176/66, 67, 89, 91 SP; 264/.5

[56] References Cited
UNITED STATES PATENTS

| | | | |
|---|---|---|---|
| 3,320,179 | 5/1967 | Gens | 176/89 |
| 3,404,201 | 10/1968 | Braun et al. | 264/.5 |
| 3,564,081 | 2/1971 | Francois | 264/.5 |
| 3,625,680 | 12/1971 | Asbury | 264/.5 |
| 3,641,227 | 2/1972 | Horsley et al. | 264/.5 |
| 3,712,809 | 1/1973 | Bumm et al. | 264/.5 |
| 3,728,274 | 4/1973 | Gerontopoulos et al. | 264/.5 |
| 3,806,565 | 4/1974 | Langrod | 264/.5 |

*Primary Examiner*—Verlin R. Pendegrass
*Assistant Examiner*—C. T. Jordan
*Attorney, Agent, or Firm*—Larson, Taylor and Hinds

[57] ABSTRACT

Sintered nuclear fuel pellets of improved dimensional stability under irradiation are produced by controlling the production of voidage in the pellets during manufacture of the pellets.

8 Claims, No Drawings to 2½% or less of the pellet volume and by having the majority of pores of about 20 μm or greater.

DESCRIPTION OF EMBODIMENTS OF THE INVENTION

As an example fuel elements were fabricated with controlled porosity uranium dioxide pellets of 92.5% theoretical density in a sheath of the type which will follow the movement of the pellets within it. The pellets had introduced pores in the range 6–25 μm with 99% of nearest neighbour pore/pore separations less than 15 μm. These fuel elements gave no significantly measurable diametral shrinkage after an irradiation at a maximum rating of 28 watts/g for 186 efpd "effective full power days" (= 5,200 MW D/te U). This irradiation approximates to that at which maximum shrinkage is calculated to occur and without controlled porosity in accordance with the invention maximum isotropic shrinkages of up to 2.5% linear can be expected. In the central high temperature regions of the fuel pellets, where the uranium dioxide was more plastic and equiaxed grain growth had taken place, there was significant evidence of extrusion of adjacent grains into the large pores to accommodate fission product swelling. The density of the outer region of the fuel was measured by mercury pyknometry and an average densification of 0.03 g/cm$^3$ obtained. This corresponds to an isotropic linear shrinkage of less than 0.1%.

Procedures have been developed which produce the structure required by the invention by means of removable organic additives, for example dextrin, ammonium oxalate, ammonium carbonate, starch, sugar, naphthalene and polyvinyl alcohol which are blended with dioxide powder of particle size less than that of the additive to produce a homogeneous mixture.

The following are examples of the use of such additives in this way.

EXAMPLE 1

Fuel pellets of 92.5% theoretical density and voidage of mean pore size 6–25 μm were manufactured for the irradiation experiment described above by the addition of 1.2% by weight of dextrin with a mean particle size of 15 μm to a standard $UO_2$ powder which without the additive would produce pellets of about 97.5% theoretical density. The density obtained by sintering dioxide powder without an additive is termed the matrix density. The mixture of uranium dioxide and dextrin was homogenised in a blender, granulated using a binder and pressed into pellets. The pellets were debonded and then sintered in hydrogen in the temperature range 1600°–1700°C.

The pellets may alternatively be manufactured without the use of a binder.

EXAMPLE 2

Pellets with a density of 75% theoretical density have been manufactured by the binderless technique using oxide normally sintering to 98% theoretical density and 6.7% by weight of ammonium oxalate in the size range 60–75 μm. Identical density results are obtained when the particle size of the oxalate is varied in the range 10–300 μm, thus allowing any desired pore/pore separation to be achieved. In each case the mean pore size was not less than 80% of that of the mean particle size of the initial additive.

EXAMPLE 3

Pellets of an oxide giving a density of 10.81 g/cm$^3$ after sintering for 4 hours at 1625°C gave a density of 9.97 g/cm$^3$ when processed under identical conditions but containing 2% by weight of ammonium oxalate with a particle size range 8–30 μm. After a wet grinding and drying by passage through an air furnace at 125°C these pellets had moisture levels of 1.5 μg/g$UO_2$ measured after reaching equilibrium in air at 20°C and 40% relative humidity. After a further 90 hours at 1625°C, the densities of the samples were 10.85 g/cm$^3$ and 10.01 g/cm$^3$ respectively corresponding to isotropic linear shrinkages of about 0.12%. On other oxide pellets without porosity control, sintered under the same conditions to 9.97 g/cm$^3$, and gave a moisture level determined in the same manner of 50 μg/g$UO_2$. These pellets densified to 10.61 g/cm$^3$ after only another 13 hours at temperature, corresponding to a linear isotropic shrinkage of about 2.0%.

EXAMPLE 4

Pellets with a density of 93% theoretical density were made by the addition of 1.9% by weight of sucrose of mean particle size approximately 30 μm to uranium dioxide normally sintering to 98% theoretical density, the mean pore size after sintering for 4 hours being 25 μm.

EXAMPLE 5

Pellets with a density of 94% theoretical density were made by the addition of 1.0% by weight of starch of mean particle size 40 μm to uranium dioxide normally sintering to 98% theoretical density. The mean pore size of the sintered pellets was 32 μm.

EXAMPLE 6

Pellets with a density of 91.5% theoretical density were made by the addition of 1.60% by weight of polyvinyl alcohol of mean particle size 120 μm to uranium dioxide normally sintering to 97.5% theoretical density. The mean pore size of the sintered pellets was 100 μm.

Nuclear fuel pellets of controlled density may be obtained in the same way with plutonium dioxide replacing all or part of the uranium dioxide.

EXAMPLE 7

Uranium plutonium mixed oxide [$(U_{0.7} Pu_{0.3})O_2$] was milled with 3% by weight of dextrin of particle size 8–20 μm and then granulated with a binder. The granules were pressed into annular pellets with densities between 5.6 and 5.8 g/cm$^3$, then debonded at 750°C in carbon dioxide and sintered at 1550°C in a 4% hydrogen/96% argon mixture. The mensuration density of the pellets was 9.44 g/cm$^3$ (86% theoretical density) and the mean pore size was about 15 μm. Lower densities of 9.18 g/cm$^3$ were achieved with the addition of 4% by weight of dextrin in repeat experiments. The particle size of the dextrin and the pore size of the pellets produced was the same as with the 3% dextrin experiment.

EXAMPLE 8

Uranium dioxide powder and plutonium dioxide powder were dry blended in a ball mill with 0.4% by weight of starch of particle size 20–40 μm and then granulated with a binder and compacted into pellets. The pellets were debonded in carbon dioxide at 800°C

CERAMIC NUCLEAR FUEL PELLETS

BACKGROUND OF THE INVENTION

This invention relates to ceramic nuclear fuel pellets.

The service life of a nuclear reactor fuel element is dependent upon interactions between the fuel element sheath and nuclear fuel within it. These interactions may be chemical — as in the corrosion of zirconium alloy sheaths by moisture in the fuel — or mechanical — by fuel swelling or fuel densification.

Sintered uranium dioxide fuel pellets in use as nuclear fuel undergo dimensional changes as a consequence of both swelling and densification. These dimensional changes have been shown to have undesirable effects on the integrity of fuel element sheaths and hence on fuel element performance. Accordingly efforts have been made to reduce dimensional instabilities resulting from the two main mechanisms which exist; these are
1. Pellet densification due to the removal of residual fine sintering porosity by irradiation and thermal processes
2. Pellet swelling due to the accumulation of solid and gaseous fission products as inclusions and bubbles.

Such efforts to produce dimensionably stable uranium dioxide pellets have previously been directed to stabilising the pores in the pellets (so that the pores are not removed by prolonged sintering) by balancing the pressure of gas contained in the pores against the surface tension forces which would otherwise lead to diminution of the pores. However these pellets, manufactured by pressing and sintering ceramic uranium dioxide powder, are generally of high density (typically greater than 95% theoretical density or 10.40 g/cm$^3$) whereas fuel specifications often require up to 10% voidage to minimise swelling due to the accommodation of fission products. For this latter purpose the uranium dioxide pellets are sintered to a density less than the thermal equilibrium value. This procedure produces a fuel which on further thermal treatment will densify to approach the equilibrium thereby causing shrinkage. Furthermore under irradiation the shrinkage may extend beyond the thermal equilibrium value. This is because in a sintered uranium dioxide pellet at equilibrium most of the pore volume is contained in pores less than a few microns in diameter, which (in order to be stable) must contain gas at pressures of over 10 atmospheres, and it has been shown that these small pores are readily removed during irradiation. Thus a pellet densifying in reactor conditions will not, in general, merely reach the thermal equilibrium value but will continue to approach the theoretical density unless prevented by other mechanisms, for example, swelling induced by fission products. It therefore follows that the porosity incorporated in a conventional uranium dioxide fuel pellet is unstable and dimensional changes result during reactor operation. The present invention seeks to provide fuel pellets of uranium dioxide in which dimensional instability is reduced.

SUMMARY OF THE INVENTION

According to one aspect of the present invention a sintered nuclear fuel pellet of uranium dioxide or plutonium dioxide or both uranium dioxide and plutonium dioxide has voidage in the form of randomly distributed pores produced by a porosity controlling technique which increases the mean pore size substantially above that normally observed after sintering without porosity control, the controlling technique also being such that all the pores are near to their equilibrium state at the designated fuel density, and each point in the fuel pellet is at most only a few grain diameters from a pore.

By means of the invention dimensional changes due to further thermal treatment can be minimised. Also the increased pore size renders the pores less liable to removal by irradiation and fission product swelling can be accommodated even after long irradiation times as voidage is still available throughout the pellet. While the pores are stable to thermal treatment they are unstable in the presence of the compressive stresses set up by fission product swelling and they shrink to reach equilibrium again. Swelling is thereby accommodated without gross dimensional changes in the fuel pellets. However the effectiveness of this mechanism depends not only on the existence of the pores but on their spacing being small enough to allow easy accommodation of the swelling. Ideally, therefore, each grain of dioxide has at least one face adjacent to a pore.

According to a second aspect of the invention a sintered nuclear fuel pellet of uranium dioxide or plutonium dioxide or both uranium dioxide and plutonium dioxide has voidage with a mean pore size in the range 6–100 $\mu$m and substantially no connected porosity.

The presence of connected porosity may be tested for by measuring the immersion and geometric densities of pellets. If these two are not in agreement connected porosity is indicated.

Pore sizes satisfying the criteria both for good densification resistance and good swelling accommodation properties at the commonly specified fuel densities lie in the range 6–100 $\mu$m for the grain sizes commonly observed during irradiation and a random array of pores. The absence of connected porosity results, after grinding to finished dimensions, in pellets having a surface area which depends only on their external physical dimensions. Conventionally produced pellets of density less than about 93% theoretical density normally contain amounts of connected porosity, with a rapid increase in connected porosity with decreasing density. The ground pellet then offers a much larger surface area to an atmosphere and moisture absorption increases markedly with decreasing density - often necessitating stringent drying procedures. With pellets in accordance with the second aspect of the invention however moisture absorption is small and almost independent of density. For example in air at 40% relative humidity moisture levels as determined by gas extraction in vacuo at 1000°C can be easily kept below 5 $\mu$g/gUO$_2$ even at densities as low as 70% theoretical density and at 90% theoretical density moisture levels as low as 2 $\mu$g/gUO$_2$ are achieved. Thus elementary drying procedures aimed only at removing the surface water after wet grinding are adequate over the whole fuel pellet density range. The absence of connected porosity in pellets in accordance with the invention also increases their mechanical strength and toughness as the essentially rounded pores generate lower stress concentrations than the corresponding amount of connected porosity. This leads to less severe chipping of the pellets during handling and grinding, a reduction both in severity and in frequency of chipping being noted.

The dimensional instability of nuclear fuel pellets in accordance with the invention may be further reduced by reducing the amount of porosity below about 5 $\mu$m and sintered in a 4% hydrogen/argon mixture at 1650°C. The density of the sintered pellets was 94% of the theoretical density and the mean pore size was about 30 μm.

EXAMPLE 9

Uranium dioxide powder and plutonium dioxide powder were dry blended in a ball mill. The resultant mixture was hand-blended with 1.7% by weight of ammonium oxalate in the size range 20–50 μm, and then granulated with a binder and compacted into pellets. The pellets were debonded in carbon dioxide at 800°C and sintered in a 4% hydrogen/argon mixture at 1650°C. The density of the sintered pellets was 91.5% of the theoretical density and the mean pore size was about 30 μm.

Pellets of controlled porosity prepared in accordance with all the examples were examined for substantial connected porosity. There was no indication of it. Further the pores were observed to be randomly distributed with each point in the pellets at most only a few (that is not more than five) grain diameters from a pore. It is believed that these results are obtained by selecting a dioxide particle size which is less than, and preferably less than one fifth of, that of the additive, and by fully homogenising the blended mixture of dioxide and additive.

We claim:

1. A sintered nuclear fuel pellet composed of metal oxide selected from the group consisting of uranium dioxide, plutonium dioxide and uranium dioxide and plutonium dioxide together, the pellet having voidage in the form of randomly distributed closed pores produced by inclusion of a fugitive pore former in the pellet prior to sintering, the mean pore size being substantially above that normally observed after sintering in the absence of a pore former the mean pore size being substantially above that normally observed after sintering, all the pores being near to their equilibrium state at the designated fuel density and each point in the fuel pellet being at most only a few grain diameters from a pore.

2. A sintered nuclear fuel pellet as claimed in claim 1 wherein each grain of dioxide has at least one face adjacent to a pore.

3. A sintered nuclear fuel pellet according to claim 1 made from dioxide powder having a matrix density of not less than 97.5% theoretical density.

4. A sintered nuclear fuel pellet composed of metal oxide selected from the group consisting of uranium dioxide and plutonium dioxide and uranium dioxide and plutonium dioxide together, the pellet having voidage with a mean pore size in the range 6-100 microns and substantially no connected porosity.

5. A sintered nuclear fuel pellet as claimed in claim 3 wherein the majority of pores have a size of at least 20 microns.

6. A sintered nuclear fuel pellet as claimed in claim 3 having at most only 2.5% of the pellet volume as pores less than 5 μm in diameter.

7. A sintered nuclear fuel pellet composed of metal oxide selected from the group consisting of uranium dioxide and plutonium dioxide and uranium dioxide and plutonium dioxide together, the pellet having a density of 70–94% theoretical density and an equilibrium moisture level in air at 40% relative humidity less than 5 micrograms per gram of dioxide.

8. A sintered nuclear fuel pellet composed of metal oxide selected from the group consisting of uranium dioxide and plutonium dioxide and uranium dioxide and plutonium dioxide together, the pellet having a density 70–94% theoretical density and an equilibrium moisture level in air at 40% relative humidity less than 2 micrograms per gram of dioxide.

* * * * *

UNITED STATES PATENT OFFICE
CERTIFICATE OF CORRECTION

PATENT NO. : 3,953,286

DATED : April 27, 1976

INVENTOR(S) : Ronald H. Watson et al

It is certified that error appears in the above-identified patent and that said Letters Patent are hereby corrected as shown below:

In Claim 5, line 1, "3" should be ...4...

In Claim 6, line 1, "3" should be ...4...

Signed and Sealed this

Twelfth Day of October 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,953,286
DATED : April 27, 1976
INVENTOR(S) : Watson et al

It is certified that error appears in the above-identified patent and that said Letters Patent are hereby corrected as shown below:

In the Claims

Claim 1, lines 9-11, after "a pore former", delete " the mean pore size being substantially .... after sintering"

Signed and Sealed this

Sixteenth Day of January 1979

[SEAL]

Attest:

RUTH C. MASON
Attesting Officer

DONALD W. BANNER
Commissioner of Patents and Trademarks